Nov. 25, 1930.      J. H. BECKER      1,782,803
PRESSURE INDICATOR
Filed Feb. 18, 1929
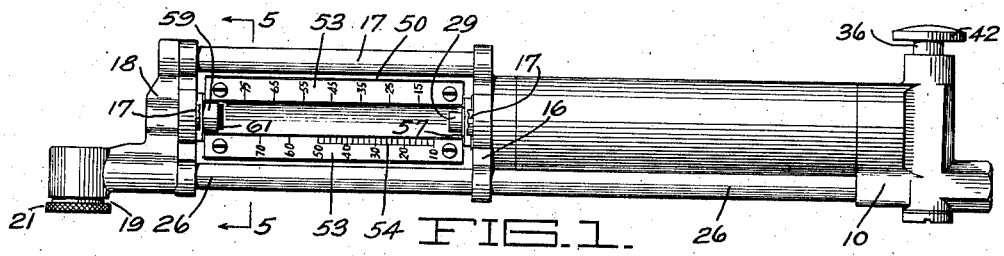
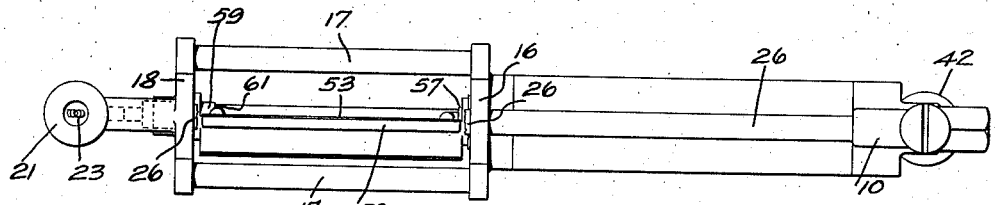
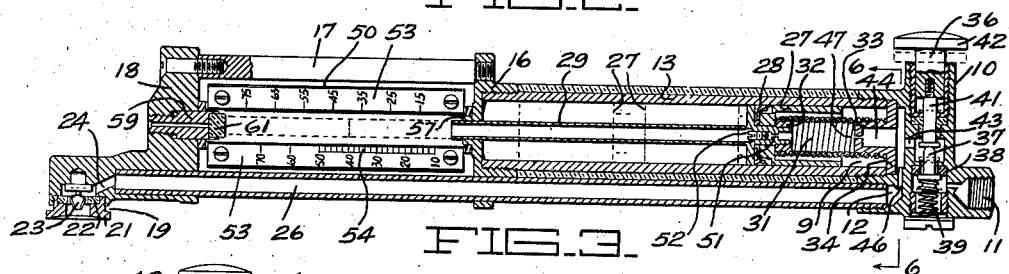
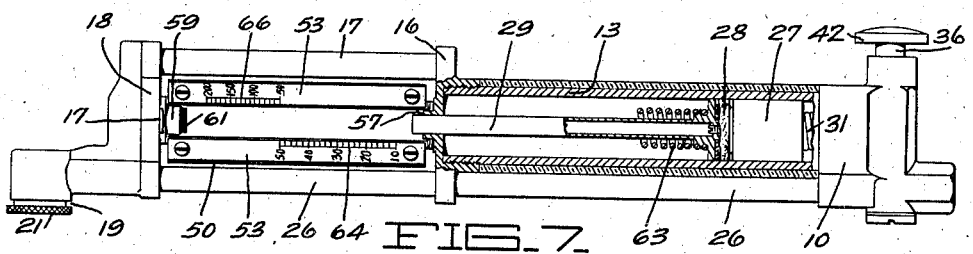
INVENTOR:
Julius H. Becker
BY White, Prost & Fryer
ATTORNEYS.

Patented Nov. 25, 1930

1,782,803

UNITED STATES PATENT OFFICE

JULIUS H. BECKER, OF SAN FRANCISCO, CALIFORNIA

PRESSURE INDICATOR

Application filed February 18, 1929. Serial No. 340,678.

This invention relates generally to devices for indicating the pressure of fluid to an operator, and is particularly useful for determining air pressure in automobile tires during their inflation.

It is a general object of this invention to construct a novel device of the above character utilizing a pressure chamber thru which fluid is continually bled while securing a pressure indication.

It is a further object of this invention to devise a novel fluid pressure indicator which can utilize a relatively weak spring for biasing the indicating member.

It is a further object of this invention to devise a pressure indicator having novel means for adjusting the indicating member independently of the tension of the biasing spring.

It is a further object of this invention to construct a device of the above character in such a manner that when manufacturing these devices the tensioning springs can vary somewhat from a set standard, without varying the accuracy of the resulting product.

It is a further object of this invention to devise a pressure indicator utilizing a pressure chamber thru which fluid is continually bled while taking an indication, but which is provided with means for preventing waste of fluid when an indication is not desired.

It is a further object of this invention to devise a simple and effective appliance for connecting to the end of an air pressure hose and which can be conveniently applied by an operator to an automobile tire valve stem, for inflating the tire and for securing simultaneously an indication of the pressure within the tire.

Further objects of the invention will appear from the following description in which I have set forth the preferred embodiment of my invention. It is to be understood that the appended claims are to be accorded a range of equivalents consistent with the state of the prior art.

Referring to the drawing:

Figure 1 is a side elevational view of a device incorporating my invention.

Fig. 2 is a plan view of the device shown in Fig. 1.

Fig. 3 is a view similar to Fig. 1, but showing the device in cross section.

Fig. 4 is an end view of the device as shown in Fig. 1.

Fig. 5 is a cross sectional detail taken along the line 5—5 of Fig. 1.

Fig. 6 is a cross sectional detail taken along the line 6—6 of Fig. 3.

Fig. 7 is a side elevational view of a modified form of my device, certain parts being shown in cross section.

The preferred form of my device can be outlined briefly as consisting of a body member having an inflow passage for connection with a source of fluid under pressure, and an outflow passage for connection to a device to which fluid is to be delivered. In conjunction with the body there is an indicating member movable in two directions, and biased or normally urged in one direction by suitable means such as a tensioning spring. The indicating member is moved against the tension of the spring by fluid pressure applied to a suitable fluid chamber, one point of this chamber being in communication with the outflow passage thru a restricted port, and another point thereof being in communication with the atmosphere thru another restricted port. A manually operated valve controls introduction of fluid under pressure from the inflow passage to both the fluid pressure chamber and to the outflow passage. When this manual valve is in full open position, the indicating member is moved to the limit of its motion and in this position continual flow of fluid thru the pressure chamber is prevented, and fluid under pressure is supplied to the outflow passage. When the manual valve is closed the indicating member takes a position corresponding to pressure in the outflow passage.

Referring to the drawing for a detail description of the embodiments therein shown, the device consists of a body member 10 having an inflow passage 11 for connection with a source of fluid under pressure, such as an air hose, and also having an outflow passage 12. In order to form a pressure chamber 9, I provide a cylindrical or tubular member 13, one end of which has a threaded connection or is otherwise suitably secured to the body member 10. The other end of cylindrical member 13 is provided with a suitable closure member 16, a plurality of bars 17 have threaded connection with closure member 16, and serve as a support for an end member 18.

End member 18 carries a suitable fitting 19, which in the preferred embodiment of the invention is intended for making quick detachable connection with a tire valve stem. A suitable form of fitting consists of a ferrule 21 engaging body member 18, and clamping between it and the body member 18 a resilient washer 22. A small cup-shaped member 23, disposed substantially in alinement with the aperture thru ferrule 21, serves to engage the valve pin of the tire valve, and depress the same when the fitting is engaged with a valve stem. A fluid passage 24 leads to fitting 19, and is in communication with outflow passage 12 of body member 10, by means of a longitudinal tube 26. Tube 26 together with rods 17, may serve to add rigidity to the structure and to aid in supporting member 18 upon the closure 16. Disposed within the cylindrical member 13, there is a suitable piston 27 having a comparatively fluid tight fit with the cylinder, and preferably provided with a flexible cup washer 28. Connected to the piston 27, there is an indicating member 29, which is preferably in the form of a tube for a purpose which will be presently explained. One end of indicating member 29 extends thru the closure member 16. For normally biasing indicating member 29 in one direction, I preferably provide a coil tensioning spring 31, one end of which is connected to the piston 27, and the other end of which is fixed with respect to the body member 10. Thus I have shown one end of this spring engaged with peripheral grooves provided upon a boss 32, this boss being formed upon piston 27, while the other end is engaged with peripheral grooves provided upon a member 33. Member 33 can be conveniently formed as a part separate from body member 10, and has a flanged marginal portion 34 clamped between the adjacent end of cylindrical member 13 and the body member 10.

For manually controlling flow of fluid from inflow passage 11 to the outflow passage, I provide a suitable form of valve 36, which can conveniently be disposed within the body member 10. One suitable form of valve consists of a movable valve member 37, normally pressed upon a seating ring 38, by means of spring 39. Member 37 can be depressed and moved to open position by means of a pin 41 depending from a movable button 42.

When button 42 is depressed, and valve member 37 is moved to open position, fluid entering inflow passage 11 is free to flow thru port 43 into a chamber 44, from which it can flow thru a port 46 of restricted area to outflow passage 12, tube 26, and passage 24. Chamber 44 also has restricted communication with chamber 9 behind the piston 27, thru port 47. Therefore for both open and closed positions of valve member 37, piston 27 is subjected to fluid pressure. With a structure as described above, it is apparent that in order to properly balance the forces upon piston 27 to secure proper indication of pressure, either the piston must be relatively small in diameter and effect pressure area, or the spring 31 must be relatively stiff. Either of these expedients is undesirable, in that it results in a device which is not accurate and which is apt to vary from time to time. Furthermore the device would be difficult to manufacture in such a way as to produce uniformly accurate results. In my invention the piston 27 is made of fairly large diameter and the spring 31 is comparatively weak, this being made possible by continually bleeding fluid thru the chamber 9 behind piston 27. Thus I provide a comparatively small or restricted port 51 thru piston 27, which is conveniently adjustable by means of a small throttling screw 52. Air bled thru port 51 is conducted to the atmosphere thru the indicating member 29. By continually bleeding air thru port 51, it is apparent that the effective static fluid pressure behind piston 27 will be substantially less than the static pressure within chamber 44, while an indication is being made. This reduction of pressure however is always proportionate to the pressure in chamber 44.

In conjunction with the outer end of indicating members 29, I provide a suitable visual scale means, which is preferably formed so that it can be easily read by an operator in any operating position of the device. For example I have shown this scale means formed of a cradle 50 or metal carrying strips 53 having suitable graduations 54. One end of cradle 50 is journaled upon a boss 57 projecting from closure member 16, and the other end is journaled upon a projecting portion of the plug 59, this plug being adjustably threaded within the end member 18. Cradle 50 is weighted in such a manner as to keep strips 53 faced upwardly at all times.

When the button 42 of the manual rod is depressed, as during inflating of the tire, the pressure within chamber 44 is relatively high, and produces sufficient pressure behind the piston 27 to force this piston outwardly to the limit of its movement. Since no attempt is made to indicate the pressure at this time, I prefer to prevent continued flow of fluid thru port 51. This is accomplished by having the outer end of indicating member 29 engage and seal against a resilient pad 61, this pad being preferably carried by the inner end of plug 59.

The operation of my device can be summarized as follows: Assuming that the inflow passage 11 is connected to a compressed air hose, fitting 19 is engaged with an automobile tire valve stem. Since member 23 depresses the pin of the tire valve, the tire is placed in communication with passage 24, tube 26 and outflow passage 12. Flow of air therefore occurs into chamber 44, thru chamber 9 and out thru port 47, and forces the piston outwardly to a position in which tension of spring 31 substantially balances the fluid pressure. By observing the position of the outer end of indicating member 29 with respect to the graduations 54, the operator can determine the pressure of air in the tire. At this time a very small amount of air is continually flowing thru the pressure chamber 9 behind piston 27, and is discharged to the atmosphere thru indicating member 29. If it is desired to introduce additional air into the tire, the operator depresses button 42 thereby establishing communication between inflow passage 11 and outflow passage 12, thru port 43, chamber 44, and port 46. At the same time however the increased pressure in chamber 44 and in the chamber 9 behind piston 27 is sufficient to force this piston outwardly and press the outer end of indicating member 29 against pad 61. Therefore while button 42 is depressed, air is being supplied to the tire, but flow of air thru the chamber 9 is prevented. When button 42 is released, the pressure in chamber 44 is immediately reduced so that indicating member 29 is withdrawn from pad 61. The indicating member then quickly assumes a position corresponding to the new pressure within the tire. Due to the manner in which the graduations 54 are mounted upon the swiveled strips 53, the graduations will always be faced upwardly and readily visible, irrespective of the angle to which the device is turned.

Due to the manner in which my invention utilizes a continual flow of fluid thru the pressure chamber behind the piston while an indication is being made, it is a simple matter to adjust the device to secure an accurate indication. Such an adjustment can be made by advancing or unscrewing the small screw 52 controlling port 51. This screw can be engaged by a suitable tool after removing plug 59. In manufacturing my device no particular care need be taken to have the springs of exact size and strength. When the devices are assembled, an adjustment of screw 52 is made to secure the proper indication.

In Fig. 7 I have shown a modification of my device suitable for indicating pressures in both low and high pressure tires. In this case a compression spring 63 has been mounted upon piston 27, and engages the inner face of closure member 16 after the piston has been moved outwardly a certain amount. The graduations upon strips 53 are divided in two parts, one part 64 being for low pressure tires, and corresponding to movements of the piston when spring 63 is not in engagement with closure member 16, and another part 66 for high pressure tires, corresponding to movements of the piston after the spring 63 is compressed by engagement with closure member 16. The device of Fig. 7 is otherwise similar to the device previously described.

I claim:

1. In a fluid pressure indicating device, a structure including a movable indicating member, a cradle arranged near the path of movement of said member, said cradle being journaled to said structure, and a visual scale carried by said cradle.

2. In a fluid pressure indicating device, a body member formed with a fluid pressure chamber, a pressure responsive element coacting with the chamber and movable in one direction by fluid pressure, resilient means urging the pressure responsive element in the opposite direction, a fitting on the body member adapted to be applied to the article containing fluid pressure to be indicated, a passage leading from the fluid pressure chamber to the fitting, and means for continuously diverting fluid from the fluid pressure chamber.

3. In a fluid pressure indicating device, a body member formed with a fluid pressure chamber, a pressure responsive element coacting with the chamber and movable in one direction by fluid pressure, resilient means urging the pressure responsive element in the opposite direction, a fitting on the body member adapted to be applied to an article containing fluid pressure to be indicated, a restricted passage for establishing communication between said article and the fluid pressure chamber, and a restricted port serving to vent fluid from the fluid pressure chamber to the atmosphere.

4. In a fluid pressure indicating device, a body or member formed with a fluid pressure chamber, a pressure responsive element coacting with the chamber and movable in one direction by fluid pressure, resilient means urging the pressure responsive element in the opposite direction, a fitting on the body member adapted to be applied to an article containing fluid pressure to be indicated, a passage leading from the said fitting to the fluid pressure chamber, a restricted port for venting fluid from the said pressure chamber to the atmosphere, and means for adjusting the effective area of said port.

5. In a fluid pressure indicating device, a fluid pressure chamber, a pressure responsive element coacting with the chamber, means for connecting the chamber to a source of fluid under pressure, a fitting adapted to be applied to an article to be inflated, a passage for establishing communication between the fluid pressure chamber and the said fitting, a restricted passage for effecting a continual flow of air through the chamber from the source of fluid under pressure, and means for interrupting said flow when the pressure within said chamber exceeds a predetermined value.

6. In a fluid pressure indicating device, a cylinder, means for connecting the cylinder to a source of fluid under pressure, a pressure operated piston adapted to move within the cylinder, a tubular member carried by the piston, a restricted port establishing communication between the cylinder and the tubular member, a fitting adapted to be applied to an article to be inflated, a passage for establishing communication between the cylinder and the fitting, and a seat fixed relative to the cylinder, and adapted to engage the outer end of the tubular member at one limiting position of the piston.

In testimony whereof, I have hereunto set my hand.

JULIUS H. BECKER.